(No Model.)
R. D. KIMBALL.
AUTOMATIC DEVICE FOR CONTROLLING TEMPERATURE.
No. 422,595. Patented Mar. 4, 1890.
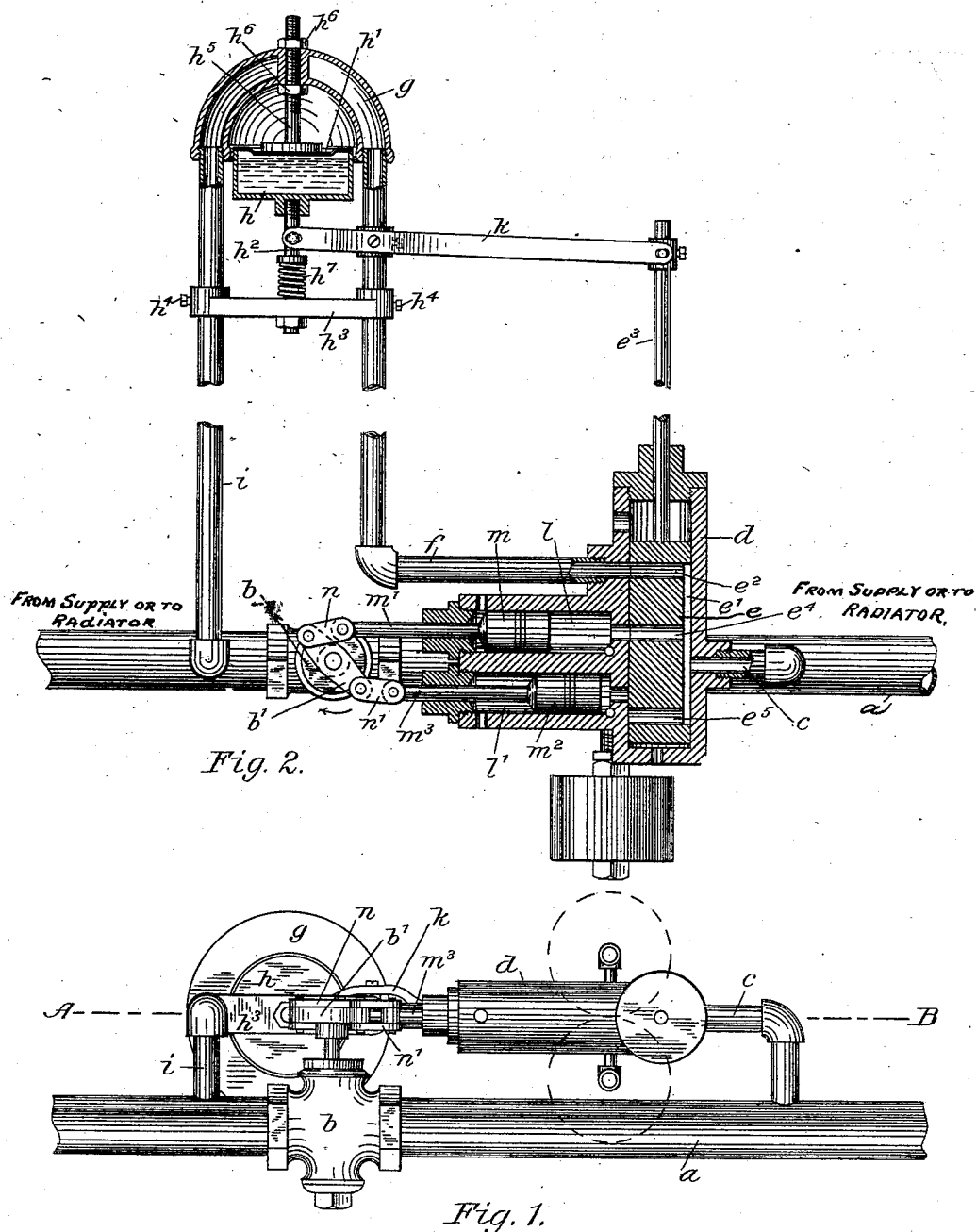

UNITED STATES PATENT OFFICE.

RICHARD D. KIMBALL, OF BOSTON, MASSACHUSETTS, ASSIGNOR TO THE KIMBALL AUTOMATIC CAR HEATING COMPANY, OF PORTLAND, MAINE.

AUTOMATIC DEVICE FOR CONTROLLING TEMPERATURE.

SPECIFICATION forming part of Letters Patent No. 422,595, dated March 4, 1890.

Application filed May 23, 1889. Serial No. 311,782. (No model.)

*To all whom it may concern:*

Be it known that I, RICHARD D. KIMBALL, of Boston, in the county of Suffolk and State of Massachusetts, have invented certain new and useful Improvements in Automatic Devices for Controlling Temperature, of which the following, taken in connection with the accompanying drawings, is a specification.

This invention relates to improvements in automatic devices for controlling temperature; and it consists in a thermostat placed within the apartment in which the temperature is to be controlled, in connection with a peculiarly-constructed steam or otherwise heated chamber from which heat is radiated upon the thermostat to supply an increased or concentrated amount of heat to the thermostat, so as to allow of the use of a less volatile liquid in the thermostat, thereby causing the same to be more powerful and capable of a greater range of adjustment; and it consists, also, in means, hereinafter more fully set forth and claimed, whereby the amount of steam or other heating medium admitted to a radiating system or circuit is controlled by the movement of an expansion device located in the apartment to be heated and in communication with the pipes of the system or circuit.

The invention will be more fully understood by referring to the accompanying drawings, in which—

Figure 1 represents a bottom view of my improved device; and Fig. 2 represents a vertical section of the same on the line A B, shown in Fig. 1.

The same letters refer to the same parts on the different parts of the drawings.

In the drawings I have shown my device as applied to a steam-supply pipe for supplying steam to heat a room, car, or any other similar inclosure where it is desired to regulate the temperature.

$a$ represents a steam-supply pipe leading from a boiler to the inclosure to be heated, and $b$ represents a common plug-valve in the supply-pipe for the purpose of shutting off the steam whenever the temperature in the inclosure has reached the desired height. From the supply-pipe $a$, between its connection to the boiler and the valve $b$, is a branch pipe $c$, which leads to a casing $d$, provided with a sliding valve $e$, said valve having a cut-away portion, which, in connection with the casings $d$, forms a chamber $e'$, in open communication with the pipe $c$ at all times. When the valve $e$ is in the position shown in the drawings, a port or passage-way $e^2$, made in the valve $e$, forms a communication from the chamber $e'$ to a pipe, $f$, leading from the casing $d$ to a hollow steam-chamber $g$, shown in the drawings in the form of a dome covering and inclosing the upper part of the expansion-chamber $h$ of the thermostat. A pipe $i$ leads from the steam-chamber $g$ to the supply-pipe $a$, and connects with the same at a point on the other side of the valve $b$ from which the pipe $c$ is connected. Thus it will be seen that when the valve $e$ is in the position shown on the drawings steam from the supply-pipe $a$ will pass through the pipe $c$, chamber $e'$, passage-way $e^2$, and pipe $f$ to the hollow steam-chamber $g$, which supplies the extra amount of heat in close proximity to the thermostat, so as to raise the temperature of the liquid in the thermostat to a point equal to the difference between the desired temperature in the inclosure in which the temperature is to be regulated and the point at which the liquid in the expansion-chamber of the thermostat will expand sufficiently to close the valve $b$ in the supply-pipe, the thermostat being placed in said inclosure, and preferably near the upper part of the inclosure, so as to be in the part of the inclosure in which the temperature is the highest. The steam from the hollow steam-chamber $g$ passes through the pipe $i$ to the supply-pipe, and thus it will be seen that a branch circulation of the steam in the supply-pipe $a$ is formed from one side of the valve $b$ to the other whenever the sliding valve $e$ is in the position shown on the drawings, and as the steam-chamber $g$ incloses the upper part of the expansion-chamber $h$, containing the volatile liquid to be expanded, a greater supply of heat will be brought in contact with the expansion-chamber $h$ than would be obtained from the temperature in the room alone, and by the use of the steam-chamber I am enabled to use a less volatile liquid in the chamber $h$, making the thermostat more powerful.

The chamber $h$ may be made in any desired form; but I prefer to make it cylindrical and to provide it with a flexible diaphragm or cover $h'$, as it is more applicable to a steam-chamber in the form of a hollow dome; but I do not want to confine myself to this precise form of chamber, as other and well-known forms may be used without departing from the spirit of my invention.

The casing of the chamber $h$ is provided with a downwardly-projecting stem or rod $h^2$, which is loosely guided in a bearing $h^3$, adjustable to and from the steam-chamber $g$ on the pipes $f$ and $i$, or on suitable rods attached to the steam-chamber.

$h^4$ $h^4$ represent set-screws for securing the bearing $h^3$ in position after it has been adjusted.

$h^5$ represents a stem or rod projecting upward from the diaphragm $h'$ and passing through a perforation in the top of the steam-chamber $g$, said stem being screw-threaded and provided with nuts $h^6$ $h^6$ above and below the steam-chamber for the purpose of adjusting the position of the chamber in relation to the steam-chamber, so as to get the desired amount of heat on said chamber $h$.

$h^7$ represents a spring surrounding the stem $h^2$ between the upper part of the bearing $h^3$ and a collar on said stem, for the purpose of helping to return the casing of the chamber $h$ to its proper position when the liquid contained in said chamber is at its normal temperature, and consequently in a contracted state, and to help to move the slide-valve $e$.

$k$ represents a lever, which is pivoted to an adjustable bearing on the pipe $f$ or on a suitable rod projecting from the bottom of the steam-chamber, said lever being pivoted to the stem $h^5$ by means of a pin or bolt or in any other and well-known manner, as may be desired. To the outer end of the lever $k$ is pivoted the end of the valve-rod $e^3$ of the sliding valve $e$, and it will be seen that when the liquid in the chamber $h$ is expanded by the temperature in the inclosure rising above the point at which the thermostat may be adjusted it will force the stem $h^2$ downward on account of the stem $h^5$ being held firmly by the nuts $h^6$ $h^6$, and by so doing the lever $k$ will be rocked on its fulcrum, causing the valve $e$ to slide upward until the port $e^2$ has been cut off from communication with the pipe $f$, and consequently the supply of steam to the steam-chamber $g$ will be stopped and the steam-chamber allowed to cool until the liquid in the chamber $h$ has contracted sufficiently to cause the valve $e$ to open communication between the port $e^2$ and the pipe $f$ by the connections between the valve $e$ and the chamber $h$, heretofore described, and thereby re-establishing a steam-supply to the steam-chamber, as shown on the drawings. By means of this adjustment of the distance between the casing $h$ of the thermostat and the steam-chamber $g$ the thermostat may be adjusted so as to operate the valve $e$ through its connecting mechanism to said valve at any desired temperature by variations in the effect of the heat radiated from said steam-chamber upon said thermostat, and thereby allowing the temperature of the apartment to be controlled at any point.

In connection with the automatic device already described I use an automatic device for opening and closing the valve $b$ in the supply-pipe $a$, so as to admit or shut off the steam from the radiators or other means by which the inclosure is heated, and such device is controlled by means of the thermostat described in the following manner: From the chamber $e'$ in the valve $e$ are two ports or passage-ways $e^4$ and $e^5$, so arranged as to communicate with one of their respective cylinders $l$ or $l'$, made in the casing $d$, according to the position of the valve $e$. When the valve is in the position shown in the drawings, the port $e^4$ is in communication with its cylinder $l$ and the valve $b$ is held open by means of the steam in the cylinder $l$ pressing against a piston or plunger $m$ in said cylinder, said piston being connected to one arm of the double-crank lever $b'$, attached to the plug of the valve $b$ by means of the piston-rod $m'$ and the link $n$, as shown, and steam is supplied to the radiators or other means by which the inclosure is to be heated. Should the temperature in the inclosure rise to a point above the one at which the thermostat is adjusted, the valve $e$ will rise, as described heretofore, and by so doing it will cut off communication between the port $e^4$ and its cylinder $l$ and open communication between the port $e^5$ and its cylinder $l'$, admitting steam into said cylinder to force a piston $m^2$ toward the outer end of the cylinder $l'$, and as said piston is connected by means of the piston-rod $m^3$ and link $n'$ to the opposite end of the double-crank lever $b'$ from where the piston $m$ is connected the plug of the valve $b$ will be turned in the direction shown by the arrow in Fig. 2 and the supply of steam shut off from the radiators in the inclosure to be heated. The valve $b$ will remain closed until the liquid in the chamber $h$ has cooled sufficiently to gradually allow the valve $e$ to assume the position shown in the drawings by the means heretofore described.

The above-described thermostat and its inclosing steam or otherwise heated chamber may be used without the automatic mechanism shown and described for closing the valve in the supply-pipe by simply connecting the lever $k$ directly to a crank-lever on the plug of the valve $b$ by means of a plain connecting-rod, and such a device can be readily understood without being represented in the drawings.

I may so vary the construction of the automatic device for opening and closing the valve $b$ by steam-pressure as to use one cylinder $l$ with one piston $m$ by connecting the piston-rod $m'$ to a single-crank lever $b'$ on the plug of the valve $b$, and have steam supplied to one side of the piston from the port $e^4$ when the valve $e$ is in one position to open the valve $b$ and to have steam supplied to the other side of the piston from the port $e^5$ when the valve $e$ is in its other position to close the valve $b$, without departing from the spirit of my invention.

In the drawings I have represented my invention as applied to a steam-supply pipe; but it is equally applicable to a hot-water or hot-air supply pipe by simple and well-known changes in the mechanical construction of the device.

Having thus fully described the nature, construction, and operation of my invention, I wish to secure by Letters Patent and claim—

1. The combination of an apartment to be heated, a radiator located therein, a pipe for supplying the radiator with a heating medium, provided with a controlling-valve, a branch pipe leading from the supply-pipe and returning thereto, an expansion device located in the said apartment and having a chamber communicating with the branch pipe, and means for causing the valve in the main pipe to move and increase or diminish the flow of the heating medium upon the movement of the expansion device, substantially as described.

2. The combination of an apparatus to be heated, a pipe for supplying the radiator with a heating medium, provided with a controlling-valve, a branch pipe leading from the supply-pipe and returning thereto, an expansion device located in the said apartment and having a chamber communicating with the branch pipe, and pistons connected with the valve in the supply-pipe, and a valve connecting with the expansion device, having ports through which steam may be admitted to actuate said pistons, and a chamber provided with the necessary ports and passages for the reception of the piston and valves, substantially as described.

3. A main supply-pipe, a valve in said supply-pipe to open and close it, two cylinders, a piston in each of said cylinders, and connecting mechanism, substantially as shown, from each of said pistons to a crank-lever for operating said valve to open and close said main supply-pipe, combined with a thermostatic chamber, a valve to supply and cut off steam from the pistons for operating the valve in the main supply-pipe, and connecting mechanism, substantially as shown, from said thermostatic chamber to said valve for supplying steam to said pistons, all to operate substantially as and for the purpose set forth and described.

4. In an automatic device for controlling temperature, the combination of a main supply-pipe $a$, a valve $b$ in it to open and close it, two cylinders $l$ and $l'$, having the respective pistons $m$ and $m^2$, said pistons being connected by the respective piston-rods $m'$ and $m^3$ and links $n$ and $n'$ and a double-crank lever $b'$ to the plug of the valve $b$, a sliding valve $e$, having ports $e^4$ and $e^5$ to open and close communication with the respective cylinders $l$ and $l'$, a branch pipe $c$ from the main supply-pipe $a$ to the valve $e$, a steam-chamber $g$, a pipe $f$, connecting the chamber $g$ with a port $e^2$ in the valve $e$ and adapted to be closed by the valve $e$, a pipe $i$, leading from the steam-chamber to the supply-pipe, a thermostatic chamber $h$, adjustably attached to the steam-chamber, a lever $k$, operated by the expansion of the liquid in said thermostatic chamber, and the valve-rod $e^3$ of the valve $e$, attached to the outer end of the lever $k$ for operating said valve, substantially as and for the purpose set forth.

In testimony whereof I have signed my name to this specification, in the presence of two subscribing witnesses, on this 20th day of May, A. D. 1889.

RICHARD D. KIMBALL.

Witnesses:
HENRY CHADBOURN,
M. B. McMANUS.